(12) United States Patent
Shah

(10) Patent No.: US 7,751,443 B2
(45) Date of Patent: Jul. 6, 2010

(54) INTRA-CHASSIS PACKET ARBITRATION SCHEME

(75) Inventor: Syed Ijlal A. Shah, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 771 days.

(21) Appl. No.: 11/620,485

(22) Filed: Jan. 5, 2007

(65) Prior Publication Data
US 2008/0165768 A1    Jul. 10, 2008

(51) Int. Cl.
*H04L 12/56* (2006.01)

(52) U.S. Cl. .................. 370/474; 370/389; 370/428; 710/100

(58) Field of Classification Search .......... 370/229, 370/235, 389, 474, 428; 710/107, 242, 100, 710/240
See application file for complete search history.

(56) References Cited

U.S. PATENT DOCUMENTS

| | | | | |
|---|---|---|---|---|
| 4,785,396 A | * | 11/1988 | Murphy et al. | ............... 710/106 |
| 5,535,208 A | * | 7/1996 | Kawakami et al. | .......... 370/391 |
| 6,678,773 B2 | | 1/2004 | Marietta et al. | |
| 6,754,752 B2 | | 6/2004 | Marietta et al. | |
| 6,862,283 B2 | | 3/2005 | Marietta et al. | |
| 7,031,258 B1 | | 4/2006 | Frisch et al. | |
| 7,102,999 B1 | * | 9/2006 | Sindhu et al. | ................ 370/235 |
| 2003/0035371 A1 | * | 2/2003 | Reed et al. | ................... 370/230 |
| 2003/0099247 A1 | | 5/2003 | Toutant et al. | |
| 2005/0083956 A1 | | 4/2005 | Carnevale et al. | |
| 2006/0039370 A1 | * | 2/2006 | Rosen et al. | ................ 370/389 |
| 2006/0259671 A1 | | 11/2006 | Swartzentruber | |
| 2006/0274788 A1 | | 12/2006 | Pong | |
| 2007/0005968 A1 | | 1/2007 | Lu et al. | |

OTHER PUBLICATIONS

Shah, Syed Ijlal Ali et al.; "RapidIO Traffic Management and Flow Arbitration Protocol"; IEEE Communications Magazine; Jul. 2006; pp. 45-52.
International Search Report and Written Opinion PCT/US 07/86928 dated May 8, 2008.

* cited by examiner

*Primary Examiner*—Jayanti K Patel
*Assistant Examiner*—Matthew Campbell

(57) ABSTRACT

A switching device and methods thereof are disclosed. One of the methods includes an arbitration process for communicating a data payload between interface modules. A first intra-chassis packet is sent by a source interface module to the target interface module. The first intra-chassis packet represents a request for permission to transmit a data payload to the target interface. A second intra-chassis packet is received at the source interface module from the target interface module indicating whether the request has been approved. If the request is approved, the source interface module sends a third intra-chassis packet comprising at least a portion of the data payload to the target interface module.

19 Claims, 6 Drawing Sheets

US 7,751,443 B2

INTRA-CHASSIS PACKET ARBITRATION SCHEME

FIELD OF THE DISCLOSURE

The present disclosure relates to communication devices and methods, and more particularly to packet-based switching devices and methods.

BACKGROUND

Switching devices, such as routers, are sometimes used in packet-based networks to route packets of data through the networks. A switching device includes a number of interface modules, with each interface module connected to a different network node capable of interfacing with one or more network devices. Data packets received at and provided from the switching devices are referred to as inter-chassis packets, because they are communicated between devices having different chasses or housings. Intra-chassis data packets are communicated between interface modules within the common chassis of the switching device.

The switching device sometimes employs a backplane switching fabric to transfer intra-chassis packets between interface modules. However, the maximum packet size that can be communicated via the backplane switching fabric is sometimes smaller than the received inter-chassis packet. Accordingly, the switching device can segment a received inter-chassis packet into more than one intra-chassis packets for communication over the backplane switching fabric. The intra-chassis packets associated with inter-chassis packets provide an inter-chassis packet communication flow through a switching device. The intra-chassis packets associated with an inter-chassis packet communication flow are buffered at the target interface module until all the intra-chassis packets in the flow are received. The inter-chassis packets associated with the communication flow are then reassembled and transmitted to an off-chassis destination.

Further, the target interface module can manage multiple communication flows by allotting buffer space to each flow. Accordingly, as the number of communication flows to a target interface module increase, the amount of buffer space required to store the intra-chassis packets for each flow can become undesirably large. Alternatively, if the buffer space is insufficient to store all incoming intra-chassis packets associated with a communication flow, some intra-chassis packets may be dropped, leading to incomplete reassembly of inter-chassis packets or requiring retransmission of dropped packets, which slows the throughput of the communication device. Accordingly, there is a need for an improved communication device and methods thereof.

DETAILED DESCRIPTION

A switching device and methods thereof are disclosed. One of the methods includes an arbitration process for communicating a data payload between interface modules. A first intra-chassis packet is sent by a source interface module to the target interface module. The first intra-chassis packet represents a request for permission to transmit a data payload to the target interface. A second intra-chassis packet is received at the source interface module from the target interface module indicating whether the request has been approved. If the request is approved, the source interface module sends a third intra-chassis packet comprising at least a portion of the data payload to the target interface module. By waiting for permission before packets containing the data payload are sent, the switching device ensures that there is sufficient buffer space for all incoming packets at the target interface module, thereby reducing the number of dropped packets and other transmission errors, and also reducing the amount of buffer space required to accommodate incoming flows. Specific embodiments of the present disclosure will be better understood with reference to FIGS. 1-10.

Figure 1:
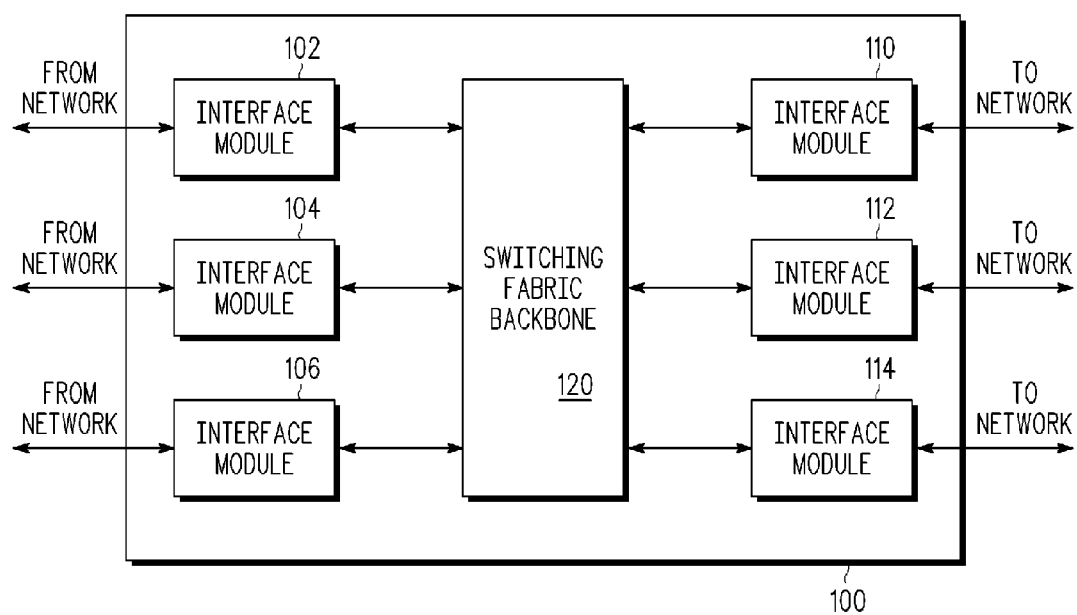
FIG. 1 is a block diagram of a particular embodiment of a switching device.

Referring to FIG. 1, a block diagram of a particular embodiment of a switching device 100 is illustrated. The switching device 100 can be a router, a digital subscriber line access multiplexer (DSLAM), and the like. The switching device 100 includes interface modules 102, 104, 106, 110, 112, and 114 (interface modules 102-114) and a switching fabric backbone 120. Each of the interface modules 102-114 includes a bi-directional connection to a network and a bi-directional connection to the switching fabric backbone 120.

During operation, each of the interface modules 102-114 receives inter-chassis packets over a network. It will be understood that a network can be any communication medium between two or more devices. The network can be a local area network (LAN), a wide area network such as the Internet, and the like. The inter-chassis packets can be Ethernet packets and the like. The interface modules 102-114 analyze received packets and based on the analysis can route the received packets to another of the interface modules 102-114 via the switching fabric backbone 120.

To route the received packets, the interface modules 102-114 segment each received packet into a number of intra-chassis packets and send the intra-chassis packets via the switching fabric backbone 120 to the appropriate target interface module. In a particular embodiment, the intra-chassis packets are sent according to a protocol that ensures that the target interface module includes sufficient buffer space to store the intra-chassis packets for each communication flow by implementing an arbitration scheme that uses intra-chassis packets to manage the communication flows. For purposes of discussion, intra-chassis packets used to manage the arbitration of communication flows are sometimes referred to as intra-chassis arbitration packets, while intra-chassis packets used to transmit a data payload of a communication flow are sometimes referred to as intra-chassis data packets. It will be appreciated that although intra-chassis data packets and intra-chassis arbitration packets are discussed as being incorporated in separate packets, data information and arbitration information could be combined into a single packet. In a particular embodiment, the intra-chassis packets are communicated according to the RapidIO protocol, which is a publicly available communication protocol.

To implement the arbitration scheme, a source interface module sends an intra-chassis packet representing a request to send prior to sending any intra-chassis data packets associated with a communication flow. The target interface module determines the amount of available memory space, and sends an intra-chassis arbitration packet to the source module indicating whether permission to transmit the communication flow is granted. This prevents the source interface module from sending intra-chassis data packets of a communication flow before receiving permission, thereby reducing the number of dropped packets at the switching device 100.

Figure 2:
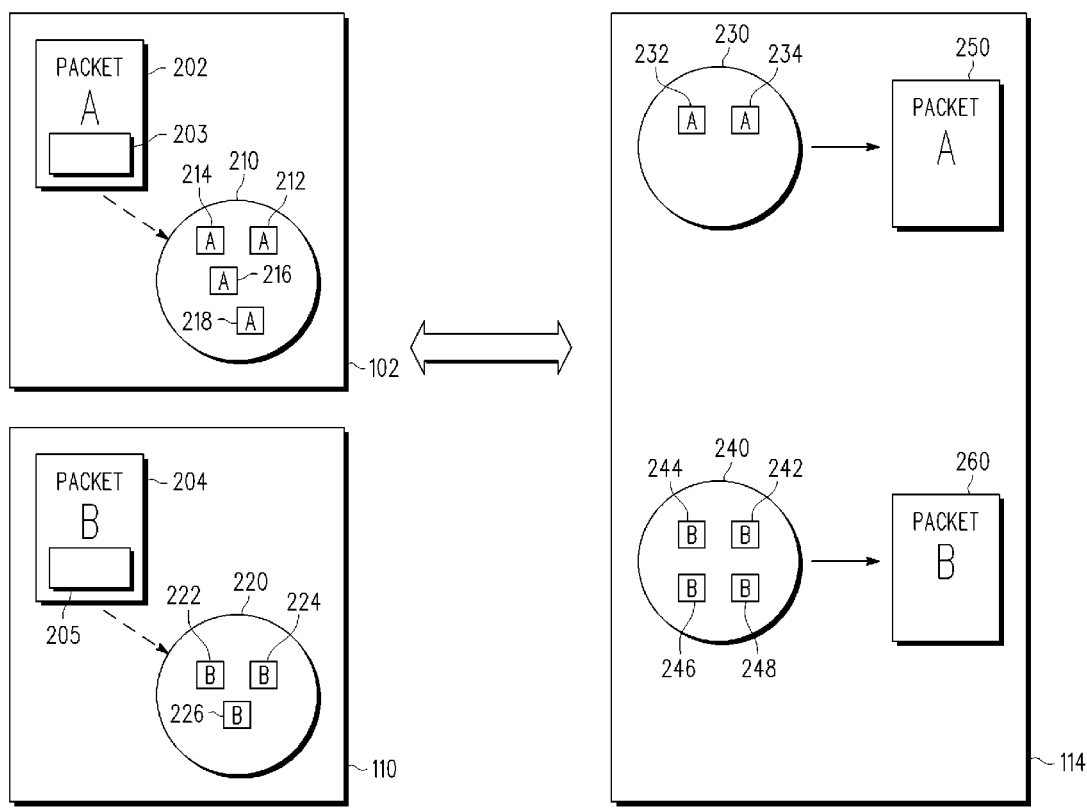
FIG. 2 is a data flow diagram of a particular embodiment of transmitting inter-chassis packets at the switching device of FIG. 1.

The operation of the switching device 100 may be better understood with reference to FIG. 2. FIG. 2 is a data flow diagram illustrating a particular embodiment of how a switching device, such as the switching device 100 processes received inter-chassis packets. As illustrated, the interface module 102 has received an inter-chassis packet 202 and analyzes a header 203 or other portion of the packet to determine that the packet should be routed to the interface module 1 14. Because the inter-chassis packet 202 is too large for transmission by the switching fabric backbone 120, the interface module 102 divides the inter-chassis packet 202 into a plurality of intra-chassis packets 210, including intra-chassis data packets 212, 214, 216, and 218 (intra-chassis data packets 212-218). Each of the plurality of intra-chassis packets 210 is of the appropriate size for transmission by the switching fabric backbone 120.

The plurality of intra-chassis data packets 210 are transmitted via the switching fabric backbone 120 and stored by interface module 114 as a plurality of intra-chassis data packets 230, including intra-chassis data packets 232 and 234 (intra-chassis data packets 232-234). Once all of the intra-chassis data packets associated with the inter-chassis packet 202 have been received, the interface module 114 assembles the plurality of intra-chassis data packets as an inter-chassis packet 250 for transmission via the inter-chassis network. Note that although the inter-chassis packet 250 is illustrated as a different inter-chassis packet at the interface modules 102 and 114, it will be appreciated that the data payload of the inter-chassis packets 202 and 250 will remain the same, and the packets themselves can be identical.

The interface module 114 can receive packets from multiple interface modules. As illustrated, the interface module 110 receives an inter-chassis packet 204 and analyzes the header 205. Based on the analysis, the interface module 110 divides the inter-chassis packet 204 into a plurality of intra-chassis data packets 220, including intra-chassis data packets 222, 224, and 226 (intra-chassis packets 222-226), and transmits the plurality of intra-chassis data packets 220 to the interface module 114, which stores the received intra-chassis data packets as a plurality of intra-chassis data packets 240, including intra-chassis data packets 242, 244, 246, and 248. After all of the intra-chassis data packets associated with the inter-chassis packet 204 have been received, the interface module 114 assembles an inter-chassis data packet 260 based on the plurality of intra-chassis data packets 240. The inter-chassis data packet 260 can be identical to the inter-chassis data packet 204 or it may differ in some respects, but will contain the same data payload.

Accordingly, each of the interface modules 102-114 can communicate with any of the other interface modules to receive and transmit packets. Further, each of the interface modules can receive and transmit multiple communication flows, with each communication flow including intra-chassis data packets associated with different inter-chassis packets. For example, as illustrated in FIG. 2, the interface module 114 can receive intra-chassis data packets associated with communication flow "A" and communication flow "B". Further, the interface module 114 can store intra-chassis data packets associated with the communication flows. Accordingly, the interface module 114 can receive and store inter-chassis packets associated with communication flows A and B as long as it has sufficient memory space to accommodate the received packets. This allows for more efficient use of the resources of the switching device 100 and for faster device throughput.

To ensure that each of the interface modules 102-114 have sufficient memory space to accommodate received intra-chassis data packets, the switching device 100 employs an arbitration scheme to manage communications between the interface modules 102-114. In particular, in the illustrated embodiment of FIG. 2, the interface module 102 must obtain permission from the interface module 114 before sending the plurality of intra-chassis packets 210. Permission is requested by transmitting an intra-chassis arbitration packet to the target interface module 114. The interface module 114 grants permission by sending a second intra-chassis arbitration packet to the source interface module 102. A similar arbitration scheme is employed for communications between the interface module 110 and the interface module 114.

Figure 3:
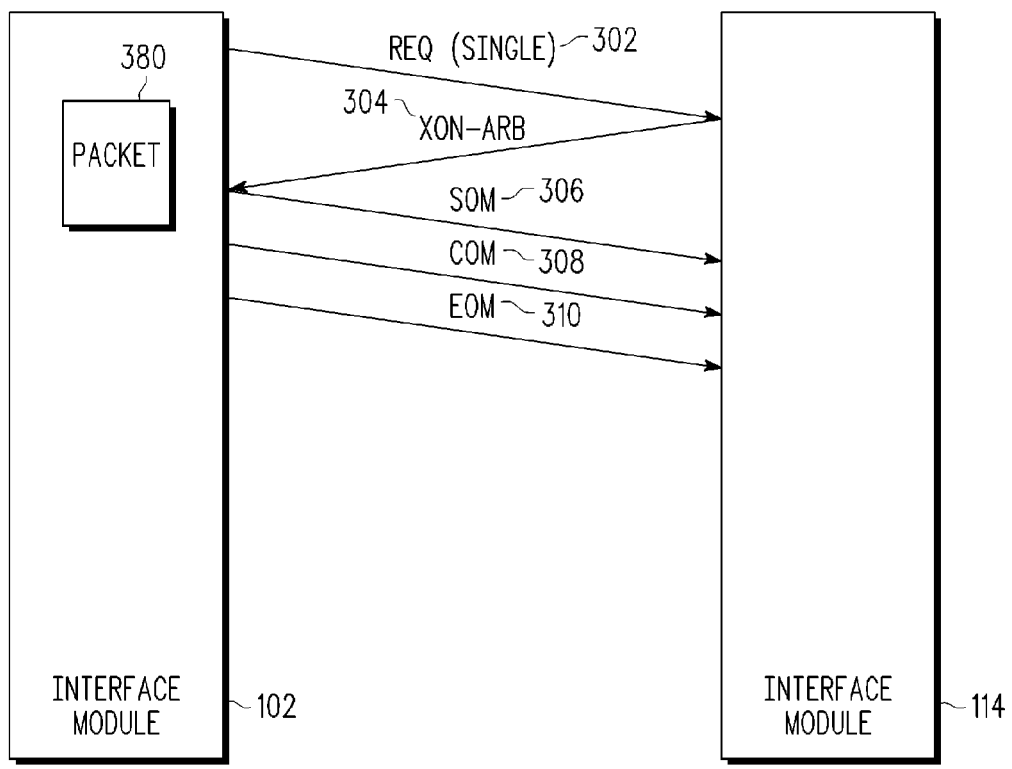
FIG. 3 is a data flow diagram of a particular embodiment of arbitrating packet transmission at the switching device of FIG. 1.

Arbitration schemes employed by the interface modules 102-114 can be better understood with reference to FIGS. 3-6. FIG. 3 illustrates an arbitration scheme where permission to send is requested prior to transmission of each inter-chassis packet, so that the communication flow based on the request is associated with a single inter-chassis packet. As illustrated in FIG. 3, the interface module 102 sends an intra-chassis arbitration packet 302 ("REQ") requesting permission to send a single inter-chassis data packet 380. In response, the interface module 114 determines if it has sufficient buffer space to store the intra-chassis data packets associated with the inter-chassis data packet 380.

If there is sufficient buffer space, the interface module 114 allocates the appropriate buffer space and sends the intra-chassis arbitration packet 304 ("$X_{ON-ARB}$") representing permission to send. In response, the interface module 102 sends an intra-chassis data packet 306 ("SOM") indicating the start of the transmission of the intra-chassis packets. The interface module then sends one or more intra-chassis data packets 308 ("COM") that together contain the data payload of the inter-chassis packet 380. After the one or more intra-chassis packets 308 have been sent, the interface module 102 sends an intra-chassis data packet 310 ("EOM") to the interface module 114 indicating that all packets have been sent. In response, the interface module 114 can reassemble the inter-chassis packet 380, send the packet, and then de-allocate the buffer space used to store the intra-chassis data packets 308.

If the interface module 114 does not have sufficient buffer space to store the intra-chassis data packets associated with the inter-chassis packet 380, it sends an intra-chassis arbitration packet $X_{OFF-ARB}$ (not shown) indicating that the packets should not be sent. In that case, the interface module 102 can resend the intra-chassis arbitration packet 302 at a later time, and not send the intra-chassis packets until permission has been granted. Accordingly, the interface module 102 does not send the intra-chassis packets 210 until there is sufficient buffer space at the interface module 114. This reduces the number of dropped packets between the interface modules 102 and 114, thereby improving the communication efficiency of the switching device 100.

In a particular embodiment, the $X_{OFF-ARB}$ intra-chassis arbitration packet includes information indicating when the interface module 102 should resend the resend the intra-chassis arbitration packet 302. For example, the $X_{OFF-ARB}$ intra-chassis arbitration packet can include information about the amount of buffer space available at the interface module 114, and the expected rate at which additional buffer space will be free for allocation. In addition, the interface module 114 can keep a list of communication flows for which $X_{OFF-ARB}$ intra-chassis arbitration packets have been sent. The interface module 114 can provide updates to the interface modules associated with the communication flows in the list as additional buffer space becomes available.

Further, it will be appreciated that intra-chassis packets can be lost in the switching fabric backbone 120. In a particular embodiment, the interface module 102 includes a counter that is started in response to transmission of the REQ intra-chassis packet 302. If no response has been received after the counter reaches a specified threshold, the interface module 102 can reissue the REQ intra-chassis packet 302. This ensures that when one or more transmissions of the REQ intra-chassis packet 302 are lost in the switching fabric backbone 120, the communication flow associated with the REQ intra-chassis packet 302 is still communicated.

In addition, the interface module 114 can maintain a counter (not shown) representing a specified time between expected transmission of intra-chassis data packets for a communication flow. If an intra-chassis data packet for a communication flow is not received within the specified time after receiving a previous intra-chassis data packet, this indicates an error condition and the buffer space for the communication flow can be deallocated. This allows the interface module 114 to maintain a desirable amount of buffer space in the event of errors in a communication flow.

Further, upon expiration of the specified time, the interface module 114 can send an intra-chassis arbitration packet to the interface module 102 indicating that a communication flow error has occurred, and the interface module can subsequently reissue the REQ intra-chassis packet 302 to ensure that the communication flow associated with the request is communicated. In a particular embodiment, after expiration of the specified time, the interface module 114 sends an $X_{OFF-ARB}$ intra-chassis arbitration packet to the interface module 102, requesting that the communication flow be stopped. The interface module 114 then starts a second counter (not shown) representing a second specified time, and deallocates the buffer space associated with the communication flow only if the expected intra-chassis data packet has not been received before the time associated with the second counter has expired. This reduces the likelihood that buffer space associated with a communication flow will be prematurely deallocated.

In a particular embodiment, the arbitration intra-chassis packets, such as the REQ intra-chassis packet 302 and the $X_{ON-ARB}$ intra-chassis packet 304, are regarded as independent traffic flows of the switching device 100. Further, in a particular embodiment the arbitration intra-chassis packets are given priority at the physical layer of the switching device 100, so that arbitration intra-chassis packets are transmitted at the first opportunity at the expense of other traffic flows, such as data communication flows, if possible.

Figure 4:
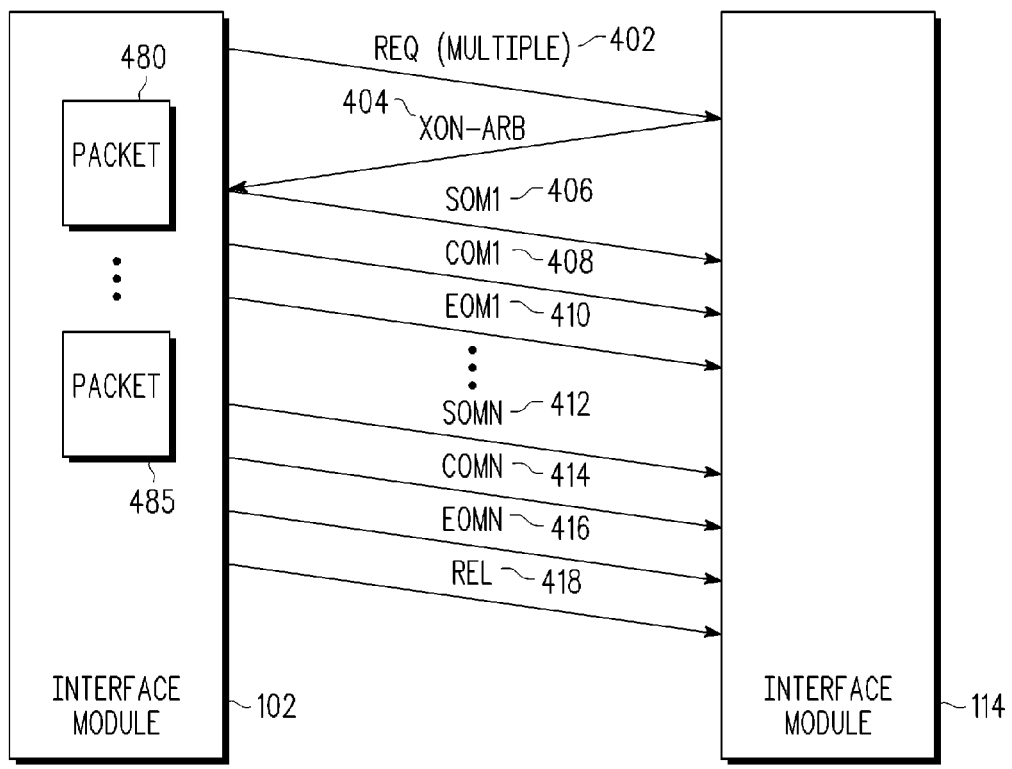
FIG. 4 is a data flow diagram of an alternative particular embodiment of arbitrating packet transmission at the switching device of FIG. 1.

FIG. 4 illustrates an arbitration scheme where permission to send is requested prior to transmission of multiple inter-chassis packets, so that the communication flow based on the request is associated with multiple inter-chassis packets. As illustrated in FIG. 4, the interface module 102 sends an intra-chassis arbitration packet 402 ("REQ") requesting permission to send a multiple inter-chassis packets, including inter-chassis data packets 480 and 485 (inter-chassis data packets 480-485). In response, the interface module 114 determines if it has sufficient buffer space to store the intra-chassis data packets associated with the inter-chassis data packets 480-485.

If there is sufficient buffer space, the interface module 114 allocates the appropriate buffer space and sends the intra-chassis arbitration packet 404 ("$X_{ON-ARB}$") representing permission to send. In response, the interface module 102 sends an intra-chassis packet 406 ("SOM1") indicating the start of the transmission of the intra-chassis packets. The interface module then sends one or more intra-chassis packets 408 ("COM1") that together contain the data payload of the inter-chassis packet 480. After all the intra-chassis data packets associated with the inter-chassis packet 480 have been sent, the interface module 102 sends an intra-chassis packet 410 ("EOM1") to the interface module 114 indicating that all packets associated with one inter-chassis packet have been sent. In response, the interface module 114 can reassemble the inter-chassis data packet 480 and send the packet. Alternatively, the interface module 114 can continue to store the intra-chassis packets associated with the inter-chassis data packet 480 for reassembly at a later time, such as after all intra-chassis packets associated with the communication flow have been received.

As illustrated, the interface module 102 continues to send intra-chassis packets associated with the communication flow. For the last inter-chassis packet 485, the interface module the interface module 102 sends an intra-chassis data packet 412 ("SOMN") indicating the start of the transmission of the intra-chassis packets associated with the inter-chassis packet 485. The interface module then sends one or more intra-chassis data packets 414 ("COMN") that together contain the data payload of the inter-chassis packet 485. After all the intra-chassis data packets associated with the data payload of the inter-chassis packet 485 have been sent, the interface module 102 sends an intra-chassis data packet 416 ("EOMN") to the interface module 114. The interface module 102 then sends an intra-chassis arbitration packet 418 ("REL") to indicate that all intra-chassis data packets associated with the communication flow have been sent. In response, the interface module 114 can reassemble any remaining inter-chassis packets associated with the communication flow and, at the appropriate time, deallocate the buffer space associated with the communication flow. Accordingly, the buffer space will not be deallocated until all intra-chassis packets associated with a data flow have been communicated.

Figure 5:
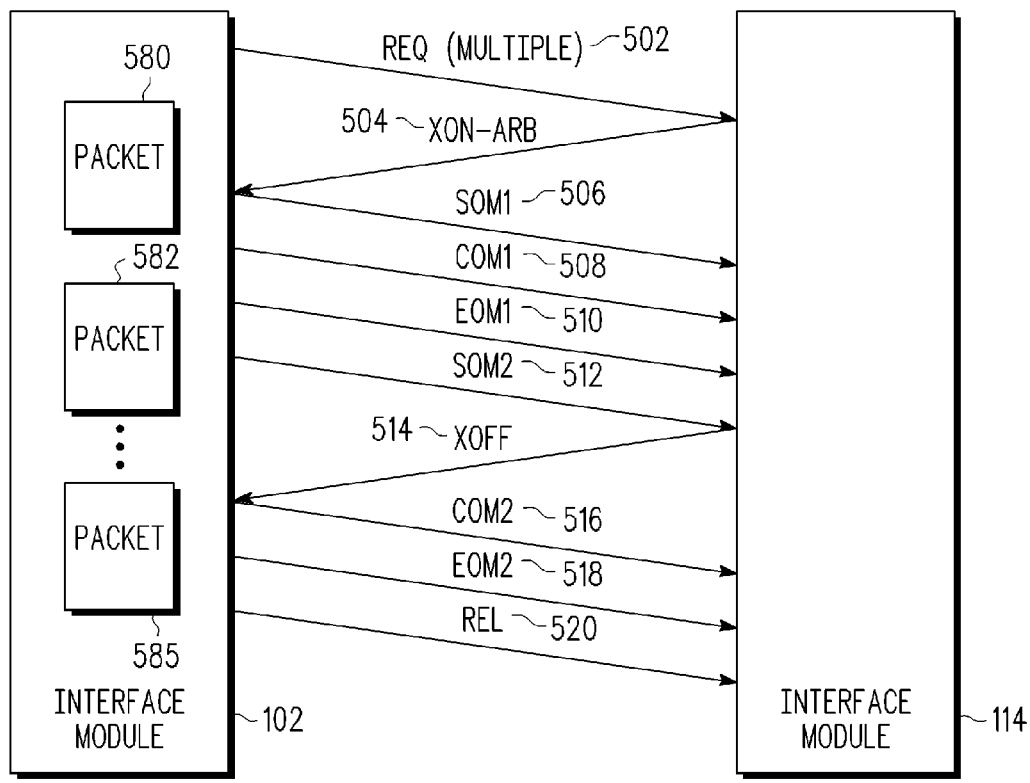
FIG. 5 is a data flow diagram of another particular embodiment of arbitrating packet transmission at the switching device of FIG. 1.

FIG. 5 illustrates an arbitration scheme where permission to send is requested prior to transmission of a communication flow of multiple inter-chassis packets, and where the communication flow can be requested to be stopped by the target interface module. This allows a target interface module to prioritize communication flows.

As illustrated in FIG. 5, the interface module 102 sends an intra-chassis arbitration packet 502 ("REQ") requesting permission to send a multiple inter-chassis data packets, including inter-chassis data packets 580, 582, and 585 (inter-chassis data packets 580-585). In response, the interface module 114 determines if it has sufficient buffer space to store the intra-chassis data packets associated with the inter-chassis data packets 580-585.

If there is sufficient buffer space, the interface module 114 allocates the appropriate buffer space and sends the intra-chassis arbitration packet 504 ("$X_{ON\text{-}ARB}$") representing permission to send. In response, the interface module 102 sends an intra-chassis data packet 506 ("SOM1") indicating the start of the transmission of the intra-chassis packets. The interface module then sends one or more intra-chassis data packets 508 ("COM1") that together contain the data payload of the inter-chassis packet 580. After the intra-chassis data packets 508 have been sent, the interface module 102 sends an intra-chassis data packet 510 ("EOM1") to the interface module 114 indicating that all data packets associated with the data payload of one inter-chassis packet have been sent. In response, the interface module 114 can reassemble the inter-chassis data packet 480 and send the packet. Alternatively, the interface module 114 can continue to store the intra-chassis packets associated with the inter-chassis data packet 480 for reassembly at a later time, such as after all intra-chassis packets associated with the communication flow have been received.

As illustrated, the interface module 102 continues to send intra-chassis packets associated with the communication flow. For the inter-chassis packet 582, the interface module the interface module 102 sends an intra-chassis data packet 512 ("SOM2") indicating the start of the transmission of the intra-chassis packets associated with the inter-chassis packet 114. After the SOM2 intra-chassis packet 512 has been received, the interface module 514 sends an intra-chassis arbitration packet 514 ("$X_{OFF}$") indicating that the communication flow should be stopped. This flow stop request can be sent, for example, if an emergency or higher-priority request to transmit has been received at the interface module 114.

After the $X_{OFF}$ intra-chassis arbitration packet 514 has been received, the interface module continues to send one or more intra-chassis packets 516 ("COM2") that together contain the data payload of the inter-chassis packet 582. After all the intra-chassis data packets associated with the inter-chassis packet 582 have been sent, the interface module 102 sends an intra-chassis packet 518 ("EOM1") to the interface module 114 indicating that all packets associated with the inter-chassis packet 582 have been sent. The interface module 102 then sends an intra-chassis arbitration packet 520 ("REL") to indicate that the communication flow has been stopped. In response, the interface module 114 can reassemble any remaining inter-chassis packets associated with the communication flow and, at the appropriate time, deallocate the buffer space associated with the communication flow. Accordingly, the interface module 102 completes sending intra-chassis packets associated with an inter-chassis packet for which transmission has begun, but does not transmit any remaining inter-chassis packets in the communication flow. The interface module 102 can send the remaining inter-chassis packets by starting another communication flow with a new REQ intra-chassis arbitration packet.

Figure 6:
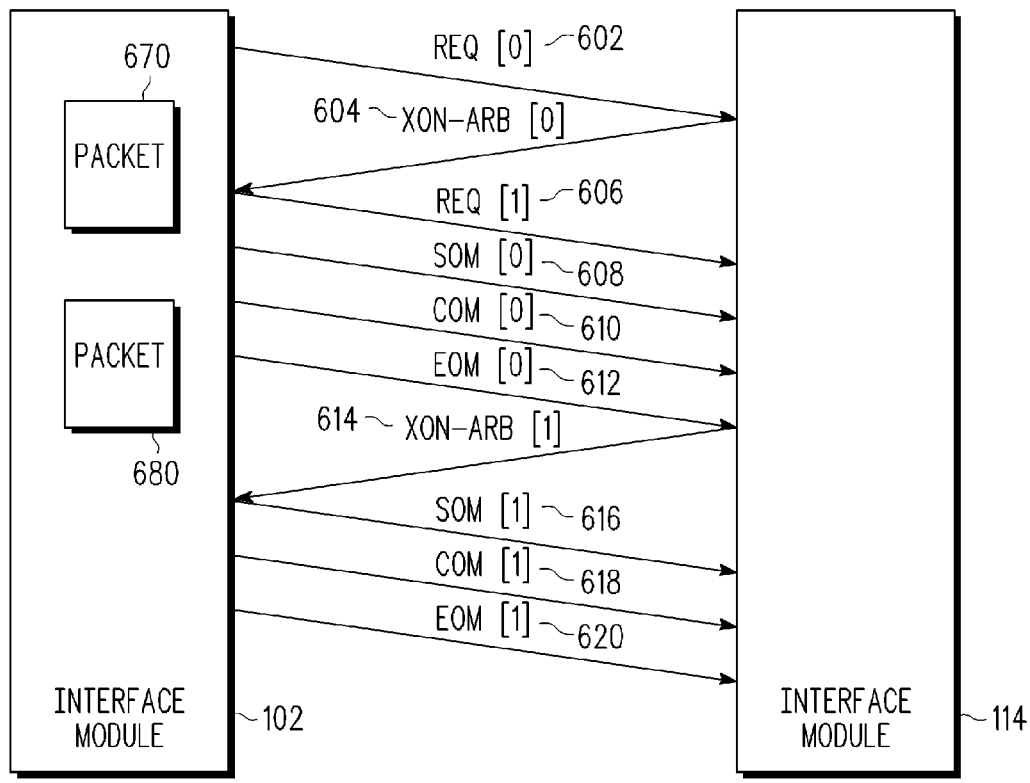
FIG. 6 is a data flow diagram of an still another particular embodiment of arbitrating packet transmission at the switching device of FIG. 1.

FIG. 6 illustrates an arbitration scheme for communication flows communicated in a pipelined fashion, so that the request for a subsequent communication flow is received prior to completion of a current flow. This allows the target interface module to process the request for the subsequent flow while receiving intra-chassis data packets associated with the current flow, and can send permission to transmit the subsequent flow upon completion of the current flow, thereby improving device throughput.

As illustrated in FIG. 6, the interface module 102 has two inter-chassis packets to communicate to the interface module 114, including inter-chassis packet 670 and inter-chassis packet 680. To communicate the inter-chassis packet 670, the interface module 102 sends the REQ[0] intra-chassis packet 602, and after receiving the permission indicated by the $X_{ON\text{-}ARB}$[0] intra-chassis packet 604, sends the inter-chassis packets 670 using the SOM[0] intra-chassis packet 608, the COM[0] intra-chassis packets 610, and the EOM intra-chassis packet 612, in similar fashion as described above with respect to FIG. 3.

In addition, while the communication flow 690 is being communicated to the interface module 114, the interface module 102 sends a REQ[1] packet 606 indicating a request for permission to transmit the inter-chassis packet 680. It will be appreciated that, although the REQ[1] packet 606 is illustrated as being received prior to the SOM[0] intra-chassis packets 608, the REQ[1] packet 606 could be received at any point during communication of the inter-chassis packet 670, including between receiving packets of the COM[0] intra-chassis packets 610. As illustrated, the interface module 114 grants permission to send the inter-chassis packet 680 after the EOM[0] intra-chassis packet 612 has been received, indicating that the communication of the inter-chassis packet 670 is complete. Thus, permission to send the inter-chassis packet 680 is not granted until after inter-chassis packet 670 has been communicated.

After permission to send the inter-chassis packet 680 has been received, the inter-chassis packets 680 is communicated using the SOM[1] intra-chassis packets 616, the COM[1] intra-chassis packets 618, and the EOM intra-chassis packet 620, in similar fashion as described above with respect to FIG. 3.

Figure 7:
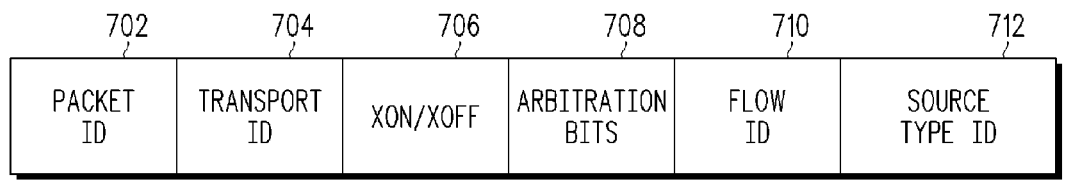
FIG. 7 is a block diagram of a particular embodiment of an intra-chassis arbitration packet of FIGS.

Referring to FIG. 7, a block diagram of a particular embodiment of an intra-chassis arbitration packet 700 is illustrated. The intra-chassis arbitration packet 700 includes a packet ID portion 702, a transport ID portion 704, an $X_{ON}$/$X_{OFF}$ portion 706, an arbitration bits portion 708, a flow ID portion 710, and a source type ID portion 712.

The packet ID portion 702 indicates a type of the intra-chassis arbitration packet 700. For example, the packet ID portion 702 can indicate that the intra-chassis arbitration packet 700 is an arbitration type packet. The target interface module can use the information in the packet ID portion 702 to appropriately parse the intra-chassis arbitration packet 700. The transport ID portion 704 includes information to indicate which interface module is transmitting the packet.

The $X_{ON}$/$X_{OFF}$ portion 706 and the arbitration bits portion 708 are used to communicate arbitration information according to the following table:

| $X_{ON}$/$X_{OFF}$ | ARB Bits | Indication |
| --- | --- | --- |
| 1 | 000 | $X_{ON}$ |
| 1 | 01x | $X_{ON\text{-}ARB}$: Flow request granted |
| 1 | 10x | Flow request for single inter-chassis packet |
| 1 | 11x | Flow request for multiple inter-chassis packets |
| 0 | 000 | $X_{OFF}$ |
| 0 | 01x | $X_{OFF\text{-}ARB}$: Flow request denied |
| 0 | 10x | Flow release |
| 0 | 11x | Not used |

The flow ID portion 710 indicates which communication flow the intra-chassis arbitration packet 700 is associated with. In addition, the source type ID portion 712 identifies the source type of the communication flow. For example, in a particular embodiment the source type ID portion 712 indicates whether the inter-chassis packets associated with the communication flow were provided by another switching device in the network or from a network endpoint.

In a particular embodiment, some or all of the information of the intra-chassis arbitration packet 700 can be incorporated in an intra-chassis packet that includes a data payload. For example, the $X_{ON}/X_{OFF}$ portion 706 and the arbitration bits portion 708 can be incorporated in a header of an intra chassis data packet. Accordingly, in a particular embodiment intra-chassis packets can include both arbitration information and data payload information. The arbitration information can include arbitration information for communication flows different from the communication flow associated with the data payload. This allows for pipelining of the arbitration information.

Figure 8:
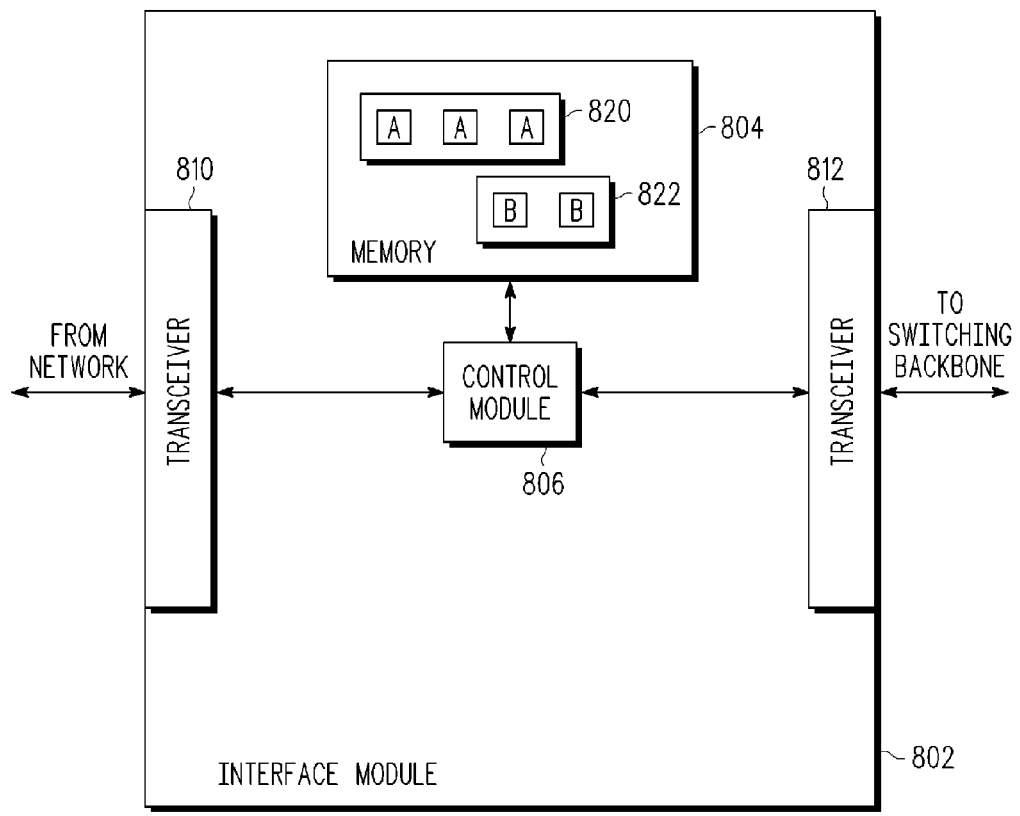
FIG. 8 is a block diagram of a particular embodiment of an interface module of FIG. 1.

Referring to FIG. 8, a block diagram of a particular embodiment of an interface module 802, corresponding to the interface module 102 of FIG. 1, is illustrated. The interface module 802 includes a communication interface 810, a communication interface 812, a memory 804, and a control module 808. The communication interface 810 includes an input connected to the inter-chassis network and an output. The communication interface includes an output connected to the switching fabric backbone 120 and an input. The control module includes an input connected to the output of the communication interface 810, an output connected to the input of the communication interface 812, and bi-directional connection to the memory 804.

During operation, the communication interface 810 receives inter-chassis packets via the communication interface 810. The control module 806 divides the inter-chassis packets into pluralities of intra-chassis packets, such as intra-chassis data packets 820, and stores the intra-chassis data packets in the memory 804.

The control module 806 analyzes the inter-chassis packets to determine to which interface module of the switching device 100 should be the target of the data intra-chassis packets 820. To transmit the intra-chassis data packets 820, the control module 806 sends an intra-chassis arbitration packet to the target interface module through the switching fabric backbone via the communication interface 812. In response to receiving an intra-chassis packet indicating permission to transmit, the control module transmits the intra-chassis data packets 820 via the communication interface 812. After sending the packets, the control module 806 sends an intra-chassis packet indicating the buffer space allocated for the intra-chassis data packets 820 at the target interface module can be released.

The interface module 802 can also receive payloads from other interface modules. In response to receiving an intra-chassis packet requesting permission to send a payload, the control module 806 analyzes the amount of memory space available in the memory 804. If sufficient memory space is available to accommodate the data, the control module 806 allocates the buffer space 822 for the intra-chassis data packets associated with the data payload. The control module 806 then stores received intra-chassis data packets associated with the data payload in the buffer space 822. In response to receiving an intra-chassis arbitration packet indicating that the buffer space can be released, the control module assembles the inter-chassis packets associated with the communication flow, transmits the inter-chassis packets via the communication interface 810, and releases the buffer space 822.

Figure 9:
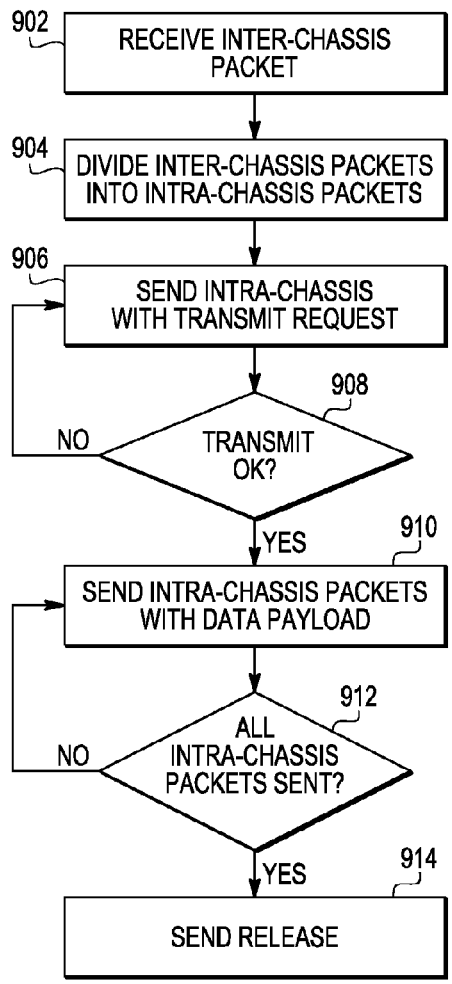
FIG. 9 is a flow diagram of a particular embodiment of a method of communicating a communication flow at a switching device.

Referring to FIG. 9, a flow diagram of a particular embodiment of a method of communication inter-chassis packets is illustrated. At block 902, an inter-chassis packet is received. Moving to block 904, the inter-chassis packet is divided into a plurality of intra-chassis packets. Proceeding to block 906, an intra-chassis packet representing a request to transmit the intra-chassis packets is sent to the target interface module.

Moving to decision block 908, it is determined whether permission has been granted to send the plurality of intra-chassis packets. In a particular embodiment, an intra-chassis packet is received from the target interface module indicating whether permission is granted. If permission has not been granted, the method returns to block 906 and the request for permission is retransmitted. If permission to transmit is granted, the method proceeds to block 910 and the intra-chassis packets are sent.

Moving to decision block 912, the transmitting module determines if all the intra-chassis packets associated with the received inter-chassis packet have been sent. If not, the method returns to block 910 and the transmitting module continues to send the intra-chassis packets. If all the intra-chassis packets have been sent, the method proceeds to block 914, and the transmitting module sends an intra-chassis packet indicating that the target module can release the buffer space allocated to the intra-chassis packets.

Figure 10:
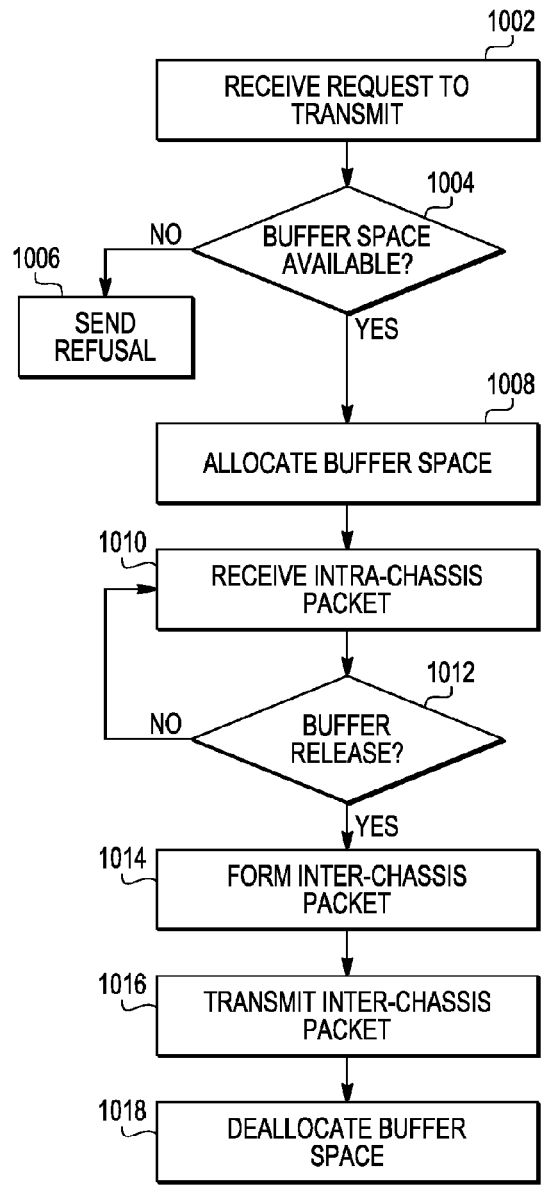
FIG. 10 is a flow diagram of a particular embodiment of a method of receiving a communication flow.

Referring to FIG. 10, a flow diagram of a particular embodiment of a method of receiving a data payload is illustrated. At block 1002, an interface module receives an intra-chassis packet representing a request to transmit one or more intra-chassis packets representing the data payload. The method proceeds to decision block 1004, and the interface module determines whether it has sufficient buffer space to accommodate the intra-chassis packets representing the data payload. If not, the method proceeds to block 1006, and the interface module sends an intra-chassis packet indicating permission to transmit is declined.

If there is sufficient buffer space, the method proceeds to block 1008 and the interface module allocates buffer space for the intra-chassis packets representing the data payload. The method moves to block 1010, and the interface module receives the intra chassis packets. Proceeding to decision block 1012, the interface module determines if a buffer release has been received. If not, the method returns to block 1010. If a buffer release has been received, the method proceeds to block 1014, and the interface module forms an inter-chassis packet based on the intra-chassis packets stored in the allocated buffer. Moving to block 1016, the interface module transmits the assembled inter-chassis packet. The method proceeds to block 1016 and the buffer space is deallocated.

A communication device and methods thereof are disclosed. One of the methods includes transmitting a first intra-chassis packet including first information representing a first authorization request to transmit a data payload to a second device, receiving a second intra-chassis packet including second information in response to transmitting the first intra-chassis packet, and transmitting a third intra-chassis packet in response to the second information representing approval of the first authorization request, the third intra-chassis packet including third information representing a first portion of the data payload.

Thus, each interface module of a switching device requests permission before sending packets containing a data payload, and does not send the packets until permission is granted. By waiting for permission before packets containing the data payload are sent, the switching device ensures that there is sufficient buffer space for all incoming packets at the target interface module, thereby reducing the number of dropped packets and other transmission errors, and also reducing the amount of buffer space required to accommodate incoming flows.

In a particular aspect, the method further transmitting a fourth intra-chassis packet including fourth information representing a second authorization request to transmit the data payload in response to the second information representing a denial of the first authorization request, receiving a fifth intra-chassis packet including fifth information in response to transmitting the fourth intra-chassis packet, and transmitting the third intra-chassis packet in response to the fifth information representing approval of the second authorization request.

In another particular aspect, the first authorization request is to transmit only a single inter-chassis packet. In still another particular aspect, the first authorization request is to transmit a plurality of inter-chassis packets. In yet another particular aspect, the method further includes receiving a fourth intra-chassis packet including fourth information representing a request to stop transmitting, and transmitting a fifth intra-chassis packet including fifth information indicating a release of buffer space allocated to the data payload.

In a particular aspect, the method includes transmitting a sixth intra-chassis packet including sixth information representing a second portion of the data payload, the sixth intra-chassis packet transmitted after receiving the fourth intra-chassis packet and prior to transmitting the fifth intra-chassis packet. In another particular aspect, transmitting the first intra-chassis packet includes transmitting a header including the first information.

In still another particular aspect, the method includes determining an amount of available buffer space in response to the first authorization request, and determining the second information based on the amount of available buffer space. In yet another particular aspect the method includes receiving an inter-chassis packet, dividing the inter-chassis packet into a plurality of segments, and determining the third intra-chassis packet based on one of the plurality of segments. In yet another particular aspect the first packet is a RapidIO packet. In another particular aspect, the method includes transmitting a fourth intra-chassis packet including fourth information indicating a release of buffer space allocated to the data payload and releasing the buffer space allocated to the data payload in response to the fourth intra-chassis packet.

One of the methods includes receiving a first intra-chassis packet including first information representing a first authorization request to transmit a first data payload to a second device, transmitting a second intra-chassis packet including second information in response to receiving the first intra-chassis packet, and receiving a third intra-chassis packet in response to the second information representing approval of the first authorization request, the third intra-chassis packet including third information representing a first portion of the first data payload.

In a particular aspect, the method further includes receiving a fourth intra-chassis packet including fourth information representing a second authorization request to transmit the first data payload in response to the second information representing a denial of the first authorization request, transmitting a fifth intra-chassis packet including fifth information in response to receiving the fourth intra-chassis packet, and receiving the third intra-chassis packet in response to the fifth information representing approval of the second authorization request.

In another particular aspect, the method further includes determining an amount of available buffer space in response to the first authorization request, and determining the second information based on the amount of available buffer space. In still another particular aspect, the method further includes forming an inter-chassis packet based on the third intra-chassis packet. In yet another particular aspect, the method includes allocating buffer space in response to the first authorization request and storing the third intra-chassis packet in the buffer space.

In another particular aspect the method further includes receiving a fourth intra-chassis packet including fourth information indicating completion of an inter-chassis packet and forming the inter-chassis packet based on data stored in the buffer space. In still another particular aspect the method includes receiving a fourth intra-chassis packet including fourth information representing a second authorization request to transmit a second data payload to the second device, wherein the fourth intra-chassis packet is received after the first intra-chassis packet, and receiving a fifth intra-chassis packet including fifth information representing a second portion of the first data payload, wherein the fifth intra-chassis packet is received after the fourth intra-chassis packet.

The device includes a first communication interface having a first output configured to transmit a first intra-chassis packet including first information representing a first authorization request to transmit a data payload to a second device, a first input configured to receive a second intra-chassis packet including second information in response to transmitting the first intra-chassis packet, a second output configured to provide the second intra-chassis packet, and a second input. The device includes a control module having an input coupled to the second output of the first communication interface, an output coupled to the second input of the first communication interface, the output to indicate to the first communication interface to transmit a third intra-chassis packet in response to the second information representing approval of the first authorization request, the third intra-chassis packet including third information representing a portion of the data payload. In a particular aspect the device includes a second communication interface including an input configured to receive an inter-chassis packet and an output, and wherein the control module is configured to provide the third intra-chassis packet based on a portion of the inter-chassis packet.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present disclosure is not intended to be limited to the specific form set forth herein, but on the contrary, it is intended to cover such alternatives, modifications, and equivalents, as can be reasonably included within the scope of the disclosure. For example, it will be appreciated that different arbitration schemes can be implemented for different communication flows at a target interface module. It will further be appreciated that, although some circuit elements are depicted and described as connected to other circuit elements, the illustrated elements may also be coupled via additional circuit elements, such as resistors, capacitors, transistors, and the like.

What is claimed is:

1. A method, comprising:
   forming a first plurality of intra-chassis packets based on a first inter-chassis packet;
   forming a second plurality of intra-chassis packets based on a second inter-chassis packet;
   transmitting a first intra-chassis packet comprising first information representing a first authorization request to transmit a data payload associated with the first inter-chassis packet and the second inter-chassis packet to a second device;
receiving a second intra-chassis packet comprising second information in response to transmitting the first intra-chassis packet;
in response to the second information indicating approval of the first authorization request:
  initiating transmission of the first plurality of intra-chassis packets;
  receiving a fourth intra-chassis packet comprising fourth information representing a request to stop transmitting;
  completing transmission of the first plurality of intra-chassis packets and stopping transmission of the second plurality of intra-chassis packets in response to receiving the fourth intra-chassis packet.

2. The method of claim 1, further comprising:
transmitting a fifth intra-chassis packet comprising third information representing a second authorization request to transmit the first inter-chassis packet and the second inter-chassis packet in response to the second information representing a denial of the first authorization request;
receiving a sixth intra-chassis packet comprising fourth information in response to transmitting the fifth intra-chassis packet; and
initiating transmission of the first plurality of intra-chassis packets in response to the fourth information representing approval of the second authorization request.

3. The method of claim 1, wherein the first authorization request is to transmit only a single inter-chassis packet.

4. The method of claim 1, wherein the first authorization request is to transmit a plurality of inter-chassis packets.

5. The method of claim 1, further comprising:
in response to stopping transmission of the second plurality of intra-chassis packets, transmitting a fifth intra-chassis packet comprising third information representing a second authorization request to transmit the second inter-chassis packet;
receiving a sixth intra-chassis packet comprising fourth information in response to transmitting the fifth intra-chassis packet; and
initiating transmission of the second plurality of intra-chassis packets in response to the fourth information representing approval of the second authorization request.

6. The method of claim 1, wherein transmitting the first intra-chassis packet comprises transmitting a header comprising the first information.

7. The method of claim 1, farther comprising:
determining an amount of available buffer space in response to the first authorization request; and
determining the second information based on the amount of available buffer space.

8. The method of claim 1, further comprising:
receiving the first inter-chassis packet and the second inter-chassis packet; and
dividing the first inter-chassis packet into the first plurality of intra-chassis packets and the second inter-chassis packet into the second plurality of intra-chassis packets.

9. The method of claim 1, wherein the first intra-chassis packet is a RapidIO packet for use in RapidIO protocol communication.

10. The method of claim 1, further comprising:
transmitting a fifth intra-chassis packet comprising fifth information indicating a release of buffer space allocated to the data payload; and
releasing buffer space allocated to data payload of the first inter-chassis packet in response to the fifth intra-chassis packet.

11. A method, comprising:
receiving a first intra-chassis packet comprising first information representing a first authorization request to transmit a first data payload to a second device;
transmitting a second intra-chassis packet comprising second information in response to receiving the first intra-chassis packet;
receiving a third intra-chassis packet in response to the second information representing approval of the first authorization request, the third intra-chassis packet comprising third information representing a first portion of the first data payload;
in response to determining buffer space associated with the data payload, transmitting a fourth intra-chassis packet representing a request to stop transmission of the first data payload; and
receiving a fifth intra-chassis packet after approval of the request to stop transmission, the fifth intra-chassis packet comprising fourth information representing a second portion of the first data payload.

12. The method of claim 11, further comprising:
receiving a sixth intra-chassis packet comprising fourth information representing a second authorization request to transmit the first data payload in response to the second information representing a denial of the first authorization request;
transmitting a seventh intra-chassis packet comprising fifth information in response to receiving the fourth intra-chassis packet; and
receiving the third intra-chassis packet in response to the fifth information representing approval of the second authorization request.

13. The method of claim 11, further comprising:
determining an amount of available buffer space in response to the first authorization request; and
determining the second information based on the amount of available buffer space.

14. The method of claim 11, further comprising:
forming an inter-chassis packet based on the third intra-chassis packet.

15. The method of claim 14, further comprising:
allocating buffer space in response to the first authorization request; and
storing the third intra-chassis packet in the buffer space.

16. The method of claim 15, further comprising:
receiving a sixth intra-chassis packet comprising fifth information indicating completion of an inter-chassis packet; and
forming the inter-chassis packet based on data stored in the buffer space.

17. The method of claim 11, further comprising:
receiving a sixth intra-chassis packet comprising fifth information representing a second authorization request to transmit a second data payload to the second device, wherein the sixth intra-chassis packet is received after the first intra-chassis packet; and
receiving a seventh intra-chassis packet comprising sixth information representing a second portion of the first data payload, wherein the seventh intra-chassis packet is received after the sixth intra-chassis packet.

18. A device, comprising:
a first communication interface comprising:
- a first output configured to transmit a first intra-chassis packet comprising first information representing a first authorization request to transmit a data payload to a second device;
- a first input configured to receive a second intra-chassis packet comprising second information in response to transmitting the first intra-chassis packet;
- a second output configured to provide the second intra-chassis packet; and
- a second input; and a control module comprising:
- an input coupled to the second output of the first communication interface; and
- an output coupled to the second input of the first communication interface, the output to indicate to the first communication interface to transmit a third intra-chassis packet in response to the second information representing approval of the first authorization request, the third intra-chassis packet comprising third information representing a portion of the data payload;

the control module further configured to indicate to the first communication interface to continue transmission of a first plurality of intra-chassis packets associated with the data payload after receiving a fourth intra-chassis packet indicating a request to stop transmission, and configured to stop transmission of a second plurality of intra-chassis packets associated with the data payload in response to the fourth intra-chassis packet.

19. The device of claim 18, further comprising:
a second communication interface comprising an input configured to receive an inter-chassis packet and an output; and
wherein the control module is configured to provide the third intra-chassis packet based on a portion of the inter-chassis packet.

* * * * *